United States Patent [19]
Ebner et al.

[11] 3,914,226
[45] Oct. 21, 1975

[54] 5-CHLOROPYRIDAZONES

[75] Inventors: Cuno Ebner, Reinach; Max Schuler, Arlesheim, both of Switzerland

[73] Assignee: Sandoz Ltd., Basel, Switzerland

[22] Filed: Nov. 16, 1972

[21] Appl. No.: 307,330

Related U.S. Application Data

[63] Continuation of Ser. No. 98,123, Dec. 14, 1970, Pat. No. 3,709,885.

[30] Foreign Application Priority Data
Dec. 19, 1969 Switzerland...................... 18917/69

[52] U.S. Cl.................. 260/250 A; 71/92; 424/250
[51] Int. Cl.[2]........................................ C07D 237/10
[58] Field of Search................................ 260/250 A

[56] References Cited
UNITED STATES PATENTS
3,709,885   1/1973   Ebner et al. .................... 260/250 A
FOREIGN PATENTS OR APPLICATIONS
2,062,364   12/1970   Germany ...................... 260/250 A

OTHER PUBLICATIONS

Ebner, et al. Chemical Abstract 75:76823q of Ger. Offen. No. 2,062,364.
Neuffer, et al. Journal of the American Chemical Society, Vol. 47, pp. 1685–1687 (1925).
Ebner, et al. Derwent Abstract 44658S–C; CH–018917 S26 of Belg. Pat. No. 760,499, dtd. 6/17/71.

*Primary Examiner*—Donald G. Daus
*Assistant Examiner*—Anne Marie T. Tighe
*Attorney, Agent, or Firm*—Gerald D. Sharkin; Robert S. Honor; Thomas O. McGovern

[57]     ABSTRACT

The invention concerns novel pyridazone compounds of the formula:

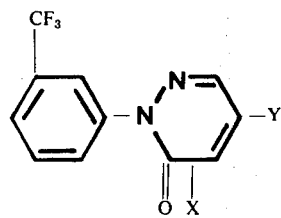

wherein Y is —NHOH —NHOR$_2$ or

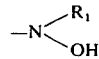

R$_1$ and R$_2$ are each alkyl of 1 to 4 carbon atoms, and
X is halogen.

The compounds are useful as intermediates in the preparation of compounds having herbicidal activity.

1 Claim, No Drawings

5-CHLOROPYRIDAZONES

This is a continuation of copending U.S. patent application Ser. No. 98,123 filed Dec. 14, 1970 which issued as U.S. Pat. No. 3,709,885 on Jan. 9, 1973.

The present invention relates to new pyridazone compounds of formula I,

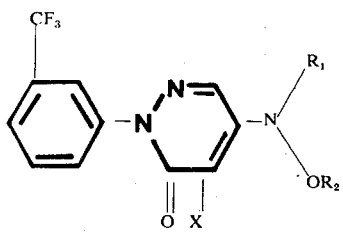

wherein $R_1$ and $R_2$ are each alkyl of 1 to 4 carbon atoms, and X is halogen.

The compounds have herbicidal properties.

The compounds of formula I may be obtained by a. reacting in the presence of a base, a compound of formula IIa,

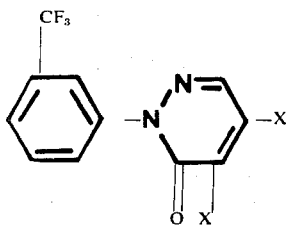

wherein

X is as defined above, with a compound of formula III,

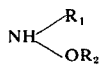

wherein $R_1$ and $R_2$ are as defined above, or b. alkylating in the presence of a base, a compound of formula IIb.

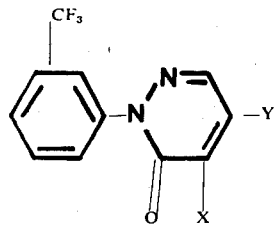

wherein Y is -NHOH, -NHOR$_2$ or

wherein $R_1$ and $R_2$ are as defined above.

The compounds of formula IIb may be produced by reacting a compound of formula IIa with a compound of formula IV, $$R_1'-NH-O-R_2' \qquad \text{IV}$$

wherein $R_1'$ and $R_2'$ are each hydrogen or alkyl of 1 to 4 carbon atoms, provided that when one of $R_1'$ or $R_2'$ is alkyl, the other is hydrogen.

The production of the compounds of formula I may be effected as follows:

In accordance with process (a) the compound of formula IIa may be reacted with the compound of formula III, in the presence of a base, e.g. triethyl amine, in an inert solvent, e.g. acetonitrile, dimethyl formamide or water, for about 6 to 48 hours, at a temperature between 80° and 150°C. After reaction, the reaction solution may be worked up in conventional manner.

In accordance with process (b) the compound of formula IIb may be alkylated in an inert solvent, e.g. acetonitrile, acetone, water, mixtures of water and a water-miscible organic solvent, at a temperature between room temperature and 40°C, with a dialkyl sulphate in the presence of a base, e.g. triethyl amine, caustic soda solution or sodium carbonate. The reaction solution may be worked up in conventional manner.

The alkylation of process (b) may, for example, be effected with a dialkyl sulphate.

In the production of a compound of formula IIb, a compound of formula IIa is reacted with a compound of formula IV in an inert solvent, e.g. acetonitrile, dimethyl formamide, lower alkanol or water in the presence of a base, e.g. excess reagent (IV), triethyl amine or sodium carbonate, at a temperature between 20° and 150°C, for 2 to 48 hours.

The starting materials required for process a) and in the production of a compound of formula IIb, using as starting materials in process (b), are known or may be prepared in known manner.

The compounds of formula I of the invention are useful herbicides, as for example indicated by their effectiveness against Plantago lanceolata, Capsella bursa pastoris, Echinochloa crus-galli, Stellaria media, Senecio vulgaris, and also against undesired grasses such as Alopecurus pratensis.

The compounds of formula I are furthermore useful selective herbicides in cotton and beet crops. Thus, cotton and beet are not significantly damaged by the use of the compounds of formula I at the doses at which undesired plant growth is destroyed.

The compounds of formula I may most conveniently be employed in admixture with conventional diluents and carrier materials. The active agent may be applied to the soil or to the weeds with the aid of conventional applicator equipment. They may be applied to the locus before or after emergence of the weeds. The active agents may be formulated into suspensions, emulsions, pastes and granulates, and may then be diluted to the desired concentration before use.

The production of formulations is effected in known manner by intimately mixing and grinding the compounds of formula I with suitable carrier materials, optionally with the addition of dispersing agents or solvents which are inert to the active agents.

In order to produce compositions which can be applied in solid forms, such as dusting agents, strewing agents, granulates, etc., the active agents are mixed with solid carriers. Examples of carriers which may be used are kaolin, talc, chalk, limestone, cellulose powder, etc.

Substances improving adhesion on plants and plant parts and/or giving a better wettability or dispersibility may also be added to the mixtures.

Spraying powers are obtained by mixing and grinding the active agents with pulverulent carrier materials until the mixture is homogeneous. The substances mentioned for the solid application forms may, for example, be used as carriers.

In order to produce solutions, the active agent or several active agents of formula I are dissolved in suitable organic solvents or solvent mixtures. Examples of suitable solvents are ketones such as acetone, alcohols, hydrocarbons, alkyl naphthalenes, alone or in admixture.

For special purposes the new compounds of formula I may also be combined with suitable known herbicides, or may be used as a mixture with the same.

The active agent formulations may, for example, contain between 2 and 90 percent, preferably between 2 and 80 percent by weight of active agent. The application forms may, for example, contain between 0.01 to 10 percent by weight of active agent.

The compounds of formula I may be used as herbicides or as selective herbicides in cotton and beet crops at doses of between about 1 and 10 kg/hectare, depending on the compound employed and the particular effect desired.

The compounds of formula (IIb) also possesses sleep inducing activity as indicated, for example, by tests in cebus monkeys using chronically implanted electrodes. Brain readings are obtained via a 10 or 16 channel electroencephalograph. For the recording sessions, the monkeys are restrained by neck and waist plates in chairs in full side observation cages at the same time every night for thirteen and half hours from Monday to Thrusday, inclusive. Gross behaviour is monitored by closed circuit television and video tape recordings. The test compound is administered orally immediately before placing the monkeys in the observation cages, or 15 or 30 minutes before placing, with at least 7 days intervening between compound administrations. Physiological saline is administered using a similar route and at the same times on all control runs. Control data are collected at least 3 days per week and accumulated to give control data for 5 to 15 sessions per monkey. Data from each session are statistically compared using computer analysis to the previous 5–15 control sessions for the particular animal, with particular emphasis given to the following phases of the sleep-wakfulness cycle: resting awake, light sleep, deep sleep, latency to onset of deep sleep, and latency to onset of first epoch of paradoxical sleep.

The sleep inducing effective dosage of active ingredient employed will vary depending on the particular individual. However, in general satisfactory results are obtained when the compound is administered at a daily dosage of from about 1 milligrams to about 200 milligrams per kilogram of animal body weight, typically given in a single dose at bedtime. For most large mammals, the total daily dosage is from about 75 to about 1500 milligrams. The preferred pharmaceutical compositions from the standpoint of preparation and ease of administration are solid compositions, particularly hard-filled capsules and tablets containing about 500 milligrams of active ingredient.

The following examples are illustrative of particular application forms of the compounds and are not in any way intended to limit the scope of the invention.

EXAMPLE A 25 parts of 1-(m-trifluoromethylphenyl)-4-(N-methyl-N-methoxy)-amino-5-chloro-pyridazone-(6), 5 parts of a condensation product from formaldehyde and naphthalene sulphonate, 2 parts of alkyl benzene sulphonate, 5 parts of dextrine, 1 part of ammonium caseinate and 62 parts of diatomaceous earth are mixed until a homogeneous mixture is obtained and are then ground until the particles are considerably smaller than 45 microns. The resulting powder may, for example, be used against weeds.

EXAMPLE B 10 parts of 1-(m-trifluoromethylphenyl)-4-(N-methyl-N-methoxy)-amino-5-chloro-pyridazone-(6) are mixed with 10 parts of isooctyl phenyl decaglycol ether and 80 parts of acetone. The resulting mixture is diluted with water to the desired concentration before use.

The herbicidal effect of the compounds of the invention is illustrated in Table 1. The evaluations indicated in Table 1 by FIGS. 1 to 9 signify: 1 = no destruction, 9 = total destruction, whereas the intermediate values given refer to further graduations between the figures on the evaluation scale. The following Table 1 shows the effect of post-emergence treatment with 4 kg of active agent per hectare.

Table 1

Herbicidal effect of 1-(m-trifluoromethylphenyl)-4-(N-methyl-N-methoxy)-amino-5-chloro-pyridazone-(6) against

| | |
|---|---|
| Plantago lanceolata | 9 |
| Capsella bursa-pastoris | 9 |
| Echinochloa crus-galli | 8 |
| Brassica oleracea | 9 |
| Stellaria media | 9 |
| Senecio vulgaris | 9 |
| Alopecurus pratensis | 9 |
| Alopecurus myosuroides | 8 |
| Cotton | 1 |
| Beet | 1 |

In cotton and carrot cultures a selective herbicidal effect is exhibited. In addition a selective effect in corn was found.

The following Examples illustrate the production of the compounds of formula I of the invention, but in no way limit the scope thereof. The temperatures are indicated in degrees Centigrade.

EXAMPLE 1

Production of
1-(m-trifluoromethylphenyl)-4-(N-methyl-N-methoxy)-amino-5-chloro-pyridazone-(6)

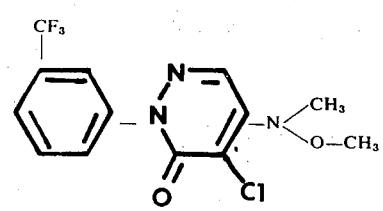

30.9 g (0.1 mol) of 1-(m-trifluoromethylphenyl)-4,5-dichloropyridazone-(6) are dissolved in 100 cc of dimethyl formamide. After the addition of 10.73 g (0.11 mols) of O,N-dimethylhydroxylamine hydrochloride and 21.21 g (0.21 mols) of triethyl amine the reaction mixture is heated to 80° for 24 hours. After precipitation with water, the precipitate is filtered off and recrystallized from alcohol. White crystals, having a M.P. of 109°–111°, are obtained.

Analysis: $C_{13}H_{11}ClF_3N_3O_2$; Molecular weight: 333.7. Calculated: C, 46.8; H, 3.3; N, 12.6%. Found: C, 46.7; H, 3.4; N, 12.7%.

EXAMPLE 2

Production of 1-(m-trifluoromethylphenyl)-4-(N-methyl-N-methoxy)-amino-5-bromo-pyridazone-(6)

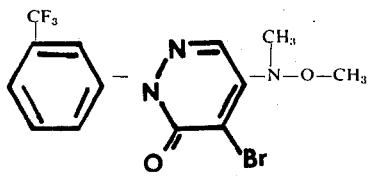

39.8 g (0.1 mol) of 1-(m-trifluoromethylphenyl)-4,5-dibromo-pyridazone-(6) are dissolved in 100 cc of dimethyl formamide. After the addition of 20.5 g (0121 mols) of O,N-dimethylhydroxylamine hydrochloride and 31.3 g (0.31 mols) of triethyl amine, the reaction mixture is heated to 80° for 24 hours. After precipitation with water, the precipitate is filtered off and recrystallized from alcohol. White crystals having a M.P. of 111°–112° are obtained.

Analysis: $C_{13}H_{11}BrF_3N_3O_2$; Molecular weight: 378.15. Calculated: C, 41.3; H, 2.9; N, 11.1%. Found: C, 41.5; H, 3.0; N, 11.1%.

EXAMPLE 3

Step A:
1-(m-trifluoromethylphenyl)-4-(N-methyl-N-hydroxy)amino-5-chloropyridazone(6)

To a solution consisting of 15.5 grams of 1-(m-trifluoromethylphenyl)-4,5-dichloropyridazone-(6) in 200 grams of isopropanol is added 6.7 grams N-methylhydroxylamine. The reaction mixture is stirred overnight at room temperature and then concentrated by vacuum. The resulting oil is dissolved in chloroform and washed with water. The chloroform layer is concentrated by vacuum and the resulting product is crystallized from benzene to yield 1-(m-trifluoromethylphenyl)-4-(N-methyl-N-hydroxy)amino-5-chloropyridazone-(6) (M.P. 114°–115°C).

Following the above procedure, but using an equivalent amount of hydroxylamine or methoxyamine in place of the N-methylhydroxylamine used therein, there is obtained 1-(m-trifluoromethylphenyl)-4-hydroxylamino-5-chloro-pyridazone-(6) or 1-(m-trifluoromethylphenyl)-4-methoxyamino-5-chloro-pyridazone-(6) respectively.

Step B: Production of 1-(m-trifluoromethylphenyl)-4-(N-methyl-N-methoxy)amino-5-chloro-pyridazone-(6)

The above 1-(m-trifluoromethylphenyl)-4-(N-methyl-N-hydroxy)amino-5-chloro-pyridazone-(6) is dissolved in 50 cc of acetone. After the addition of 13 g (0.11 mols) of dimethylsulfate and 10g (0.10 mols) of triethyl amine the reaction mixture is stirred at room temperature for 6 hours. After precipitation with water, the precipitate is filtered off and recrystallized from alcohol and white crystals, having a m.p. of 109°–111°, are obtained.

When the above process is carried out using an equivalent amount of 1-(m-trifluoromethylphenyl)-4-hydroxylamino-5-chloro-pyridazone-(6) or 1-(m-trifluoromethylphenyl)-4-methoxyamino-5-chloropyridazone-(6) in place of the 1-(m-trifluoromethylphenyl)-4-(N-methyl-N-hydroxy)amino-5-chloro-pyridazone-(6) used therein, the title product is again obtained.

What is claimed is:
1. A compound of the formula:

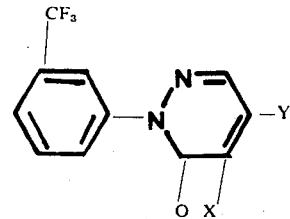

wherein Y is -NHOH, -NHOR$_2$ or

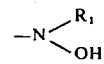

where R$_1$ and R$_2$ are each alkyl of 1 to 4 carbon atoms, and X is chlorine or bromine.

* * * * *